UNITED STATES PATENT OFFICE.

HENRI RAYMOND VIDAL, OF PARIS, FRANCE.

PROCESS OF OBTAINING TRIPHENYLMETHANE DERIVATIVES.

SPECIFICATION forming part of Letters Patent No. 609,599, dated August 23, 1898.

Original application filed July 24, 1897, Serial No. 645,859. Divided and this application filed January 11, 1898. Serial No. 666,351. (No specimens.) Patented in France February 24, 1897, No. 264,384, and in England March 2, 1897, No. 5,535.

*To all whom it may concern:*

Be it known that I, HENRI RAYMOND VIDAL, a citizen of the Republic of France, residing at Paris, France, have invented new and useful Improvements in Coloring-Matters, which improvements are fully set forth in the following specification, and for which I have obtained patents in Great Britain, No. 5,535, dated March 2, 1897, and in France, No. 264,384, dated February 24, 1897.

This invention has for its object the production of tricarboxylated products derived from phenolic and amidated compounds of triphenylmethane.

This application is a division and continuation of my application filed July 24, 1897, Serial No. 645,859, which is now Patent No. 603,300, dated May 3, 1898.

Example: I heat for twenty-four hours in an oil-bath in an enameled iron kettle salicylic acid, thirty-seven kilos; oxalic acid, twenty-five kilos; sulfuric acid, fifteen kilos. The product obtained is ground in ten times its weight of water, and the water is driven off and purified by a solution in its weight of metabisulfite of soda diluted in ten times its weight of water.

The coloring-matter is precipitated from the solution in the metabisulfite by sulfuric acid, and the sulfurous acid is driven off by ebullition.

The coloring-matter is separated by filtration and desiccated.

The formula of the tricarboxylated derivative of triphenylcarbinol is as follows:

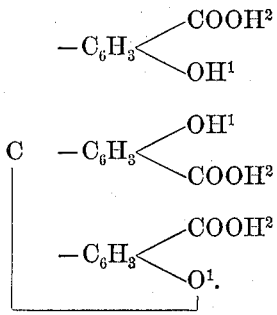

If in the preceding reaction I substitute for salicylic acid metaoxybenzoic acid, I obtain a tricarboxylated derivative in which the carboxylated group is situated with reference to the phenolic group in the meta position instead of in the ortho position.

Oxy-beta-naphthoic acid reacts by analogy under the same conditions as salicylic and metaoxybenzoic acid, producing the tricarboxylated derivative of trinaphtholcarbinol.

If I replace the oxycarbolated products by the amidocarboxylated products, such as ortho and metamido benzoic acids, operating under the same conditions, I obtain the tricarboxylated derivative of the triamidotriphenylcarbinol.

In all these reactions I may substitute as condensing agents chlorid of zinc and formic acid for sulfuric and oxalic acid.

The tricarboxylated derivatives, which occur in an orange-colored mass, are little soluble in water, but are soluble in alkalies and concentrated acids.

Having thus described my invention, what I claim as new, and desire to secure by Letters Patent, is—

The process of producing tricarboxylated derivatives of phenolic or amidated compounds of triphenylmethane consisting in heating said compounds in presence of a condensing agent such as oxalic and sulfuric acid, substantially as described.

In testimony whereof I have signed this specification in the presence of two subscribing witnesses.

HENRI RAYMOND VIDAL.

Witnesses:
 EDWARD P. MACLEAN,
 ANTOINE ROUSSANNEST.